Feb. 25, 1941.  W. J. WITTHAUS  2,233,235
FLUID LEVEL INDICATOR
Filed Oct. 16, 1939
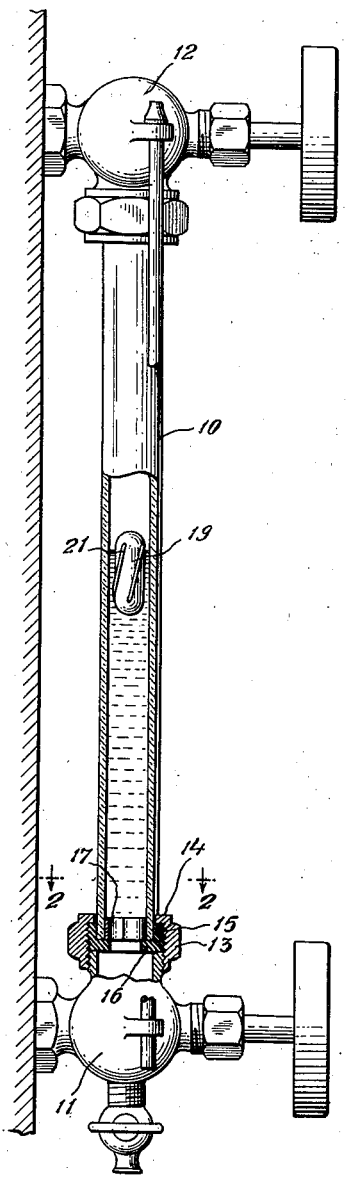
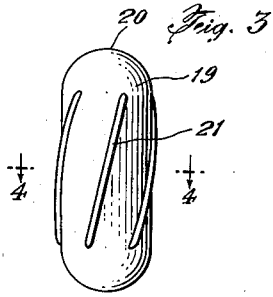
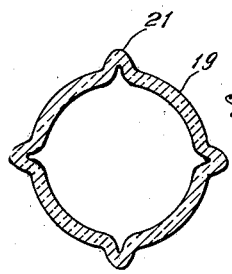
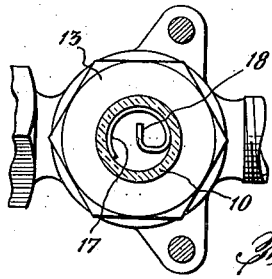
INVENTOR.
William J. Witthaus
BY John P. Chandler
his ATTORNEY.

Patented Feb. 25, 1941

2,233,235

UNITED STATES PATENT OFFICE 2,233,235

FLUID LEVEL INDICATOR

William J. Witthaus, Queens Village, N. Y.

Application October 16, 1939, Serial No. 299,712

1 Claim. (Cl. 73—319)

This invention relates to new and useful improvements in indicating devices for gauge glasses which show the water level in boilers and the like, and relates more particularly to an improved visible float which is positioned within the gauge glass and which follows the movement of liquid within the glass as the water in the boiler changes its level.

Indicating floats have heretofore been placed within gauge glasses, but these for the most part have been unsatisfactory in that they frequently stick to the glass and accordingly do not travel with the water as the same varies its level. Moreover, in the general run of boilers there is frequently an accumulation of dirt and sediment which enters the gauge glass and accumulates on the inner surface thereof, thus making even a relatively visible float difficult to see on occasions.

It is one of the principal objects of the present invention to provide a float made preferably from glass, the float being so constructed as to prevent the possibility of clinging to the glass, and also having means on the exterior thereof for scraping the side of the glass, thus removing the accumulated dirt and other material.

Another object of the invention is the provision of a novel level indicator which may be useful in any instance wherein it is desired to determine the level of liquid in a tubular member.

In the drawing:

Fig. 1 is a side elevation, partially in section, of a gauge glass, the view showing a side elevation of the preferred embodiment of the present float;

Fig. 2 is a horizontal section taken on line 2—2 of Fig. 1 and shows means positioned at the lower, as well as the upper, end of the glass for preventing the float from leaving the glass when the water is low or high, as the case may be, and thus entering the boiler;

Fig. 3 is an enlarged side elevation of the preferred float structure; and

Fig. 4 is a transverse section taken on line 4—4 of Fig. 3.

Referring now to the drawing, and more particularly to Fig. 1 thereof, a gauge glass 10 is illustrated as being supported at opposite ends thereof by conventional cut-off valves 11 and 12, the actual connection between the glass and the valve being effected by means of a nut 13 having an inwardly turned flange 14, which encloses the upper end of a gasket 15 having an inwardly turned flange 16. The inner diameter of this annular flange portion 16 is smaller than the inner diameter of the glass 10 and an annular stop member 17, having a centrally disposed portion 18, rests upon this flange portion 16. This inwardly turned portion 18 passes through the center of the glass and thus prevents the float, which is designated as 19, from passing out of the glass at the lower end thereof. A similar stop member (not shown) is positioned at the upper end of the glass and may be retained in such position by frictional engagement with the inner walls of the glass.

The float 19 is, as was previously pointed out, preferably made from glass, although it may be formed from sheet metal or from any suitable molded material, glass being preferred on account of its relative lightness of weight. The float is substantially cylindrical in shape and is preferably provided with rounded end portions 20, the length of the float being substantially twice its diameter. The particular improvement in the float structure 19 resides in the provision of the spaced, spirally disposed spline portions 21 extending over the major portion of the length of the float.

The float is desirably formed by the glass blowing method, the tube of glass being positioned within a properly formed mold after which the glass is heated and then blown into the suitable recesses in the mold, thus forming spline portions, the walls of which are desirably of the same thickness as the side walls of the float in order to cut down the total weight of the structure.

It will be noted that the spline portions are substantially semi-circular in transverse section and it has been found that this shape is preferable to a triangular shape forming a relatively sharp edge, or any other shape. In order to make the float more visible, it is desirably formed of brightly colored glass.

Whereas the improved float is shown in connection with a gauge glass, it will be apparent that it has other uses as a liquid level indicator. For instance, in chemical laboratories in transparent tubular members which are graduated and which contain fluids, the float is useful in determining the exact height of the columns of fluid. It is also useful in fountain pens having transparent barrels, the float indicating the amount of ink contained within the barrel. Whereas the preferred embodiment of this invention is described as being formed from glass, it may nevertheless be made from metal or from plastics or other moldable material.

What I claim is:

A visible float for insertion within a gauge glass or the like to indicate the level of fluid contained therein, said float comprising a substantially cylindrical, elongated body portion formed of colored plastic material, such body portion being hollow and being provided with rounded end portions forming a sealed tubular member, the length of the float being substantially twice its diameter, and a plurality of spaced spirally disposed splines formed integrally with such body portion and extending over the major portion of its length, such splines being substantially semi-circular in transverse section.

WILLIAM J. WITTHAUS.